(12) United States Patent
Bauch et al.

(10) Patent No.: US 8,012,444 B2
(45) Date of Patent: Sep. 6, 2011

(54) PROCESS AND APPARATUS FOR GENERATING HYDROGEN

(75) Inventors: Christian Bauch, Usingen (DE); Norbert Auner, Glashütten (DE); Birgit Urschel, Usingen (DE)

(73) Assignee: SPAWNT Private S.A.R.L., Luxembourg (LU)

( * ) Notice: Subject to any disclaimer, the term of this patent is extended or adjusted under 35 U.S.C. 154(b) by 412 days.

(21) Appl. No.: 12/084,815

(22) PCT Filed: Nov. 9, 2006

(86) PCT No.: PCT/EP2006/010724
§ 371 (c)(1),
(2), (4) Date: Jun. 3, 2008

(87) PCT Pub. No.: WO2007/054290
PCT Pub. Date: May 18, 2007

(65) Prior Publication Data
US 2010/0150821 A1   Jun. 17, 2010

(30) Foreign Application Priority Data

Nov. 9, 2005  (DE) .......................... 10 2005 053 781
May 3, 2006   (DE) .......................... 10 2006 020 786

(51) Int. Cl.
*C01B 33/00* (2006.01)
(52) U.S. Cl. ...................................... 423/324
(58) Field of Classification Search .................. None
See application file for complete search history.

(56) References Cited

U.S. PATENT DOCUMENTS

| | | | |
|---|---|---|---|
| 909,536 A | 1/1909 | Brindley | |
| 3,669,751 A | 6/1972 | Richman | |
| 3,895,102 A | 7/1975 | Gallagher | |
| 6,663,681 B2 * | 12/2003 | Kindig et al. | 48/127.5 |
| 7,493,765 B2 * | 2/2009 | Akiyama et al. | 60/721 |
| 2004/0151664 A1 | 8/2004 | Auner | |
| 2005/0042165 A1 | 2/2005 | Akiyama et al. | |

FOREIGN PATENT DOCUMENTS

| | | |
|---|---|---|
| DE | 216 768 | 11/1908 |
| DE | 489 932 | 2/1930 |
| DE | 528 498 | 6/1931 |
| DE | 199 54 513 | 5/2000 |
| DE | 19954513 A1 * | 5/2000 |
| DE | 101 55 171 | 6/2002 |

(Continued)

OTHER PUBLICATIONS

International Search Report.

(Continued)

*Primary Examiner* — Melvin C Mayes
*Assistant Examiner* — Stefanie Cohen
(74) *Attorney, Agent, or Firm* — Collard & Roe, P.C.

(57) ABSTRACT

A solution is to be created, with a method and a device for generating hydrogen, in which silicon and/or an alloy that contains silicon is reacted in a reaction vessel (1), with an alkaline solution as a catalyst, so that the process, after starting, runs continuously and catalytically in the presence of silicon dioxide as a nucleating agent, without further addition of lye and without using higher pressures and temperatures (hydrothermal conditions).

Figure 1:
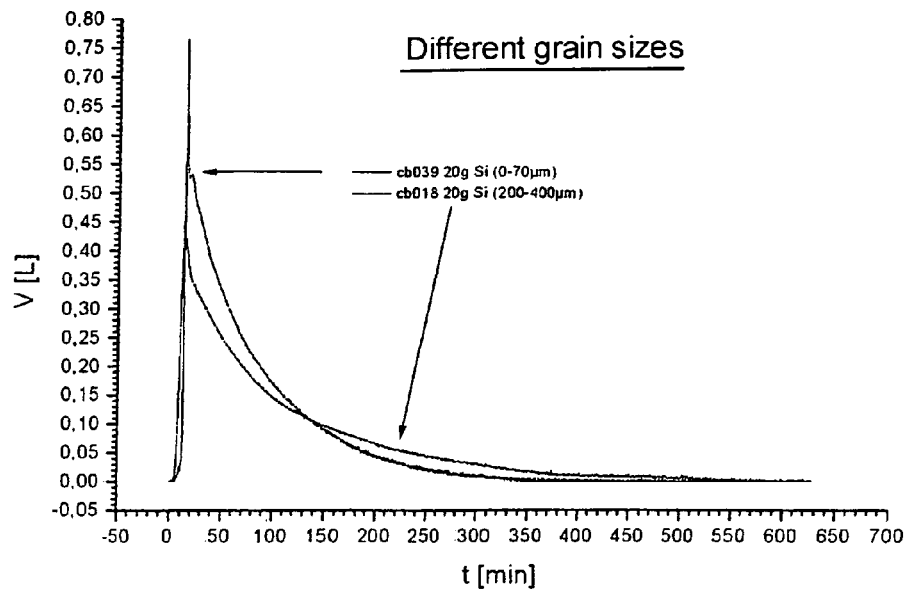
Figure 2:
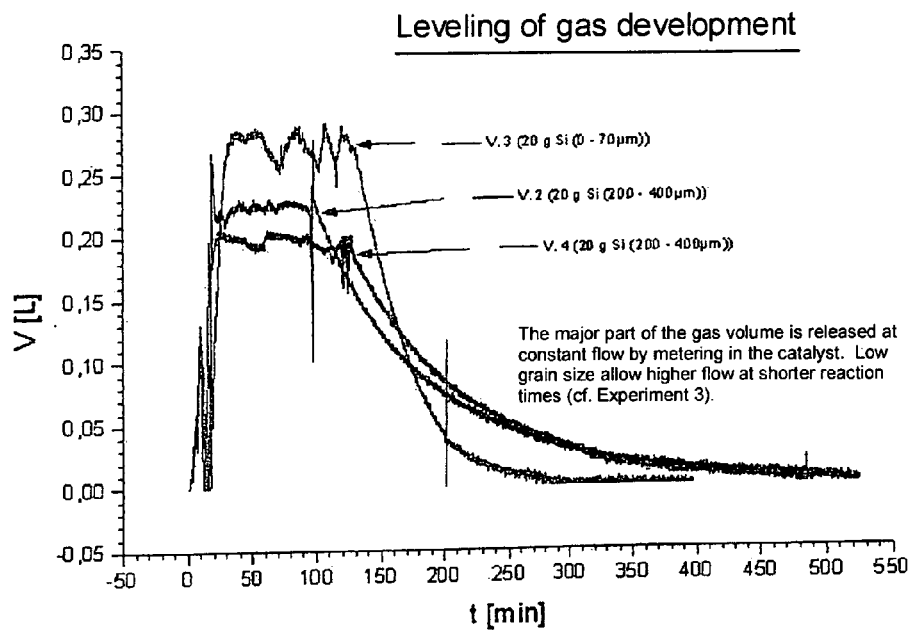
Figure 3:
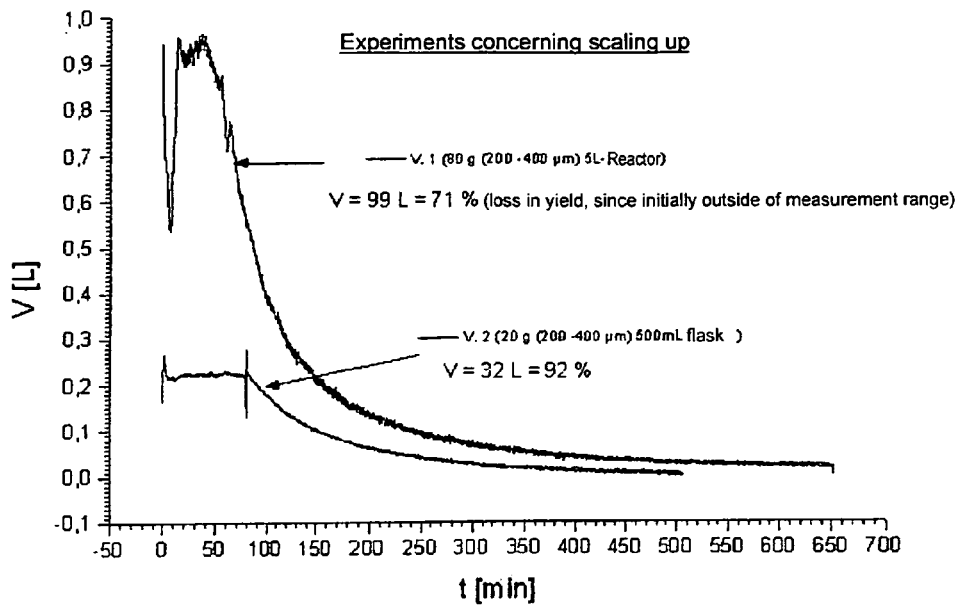
Figure 4:
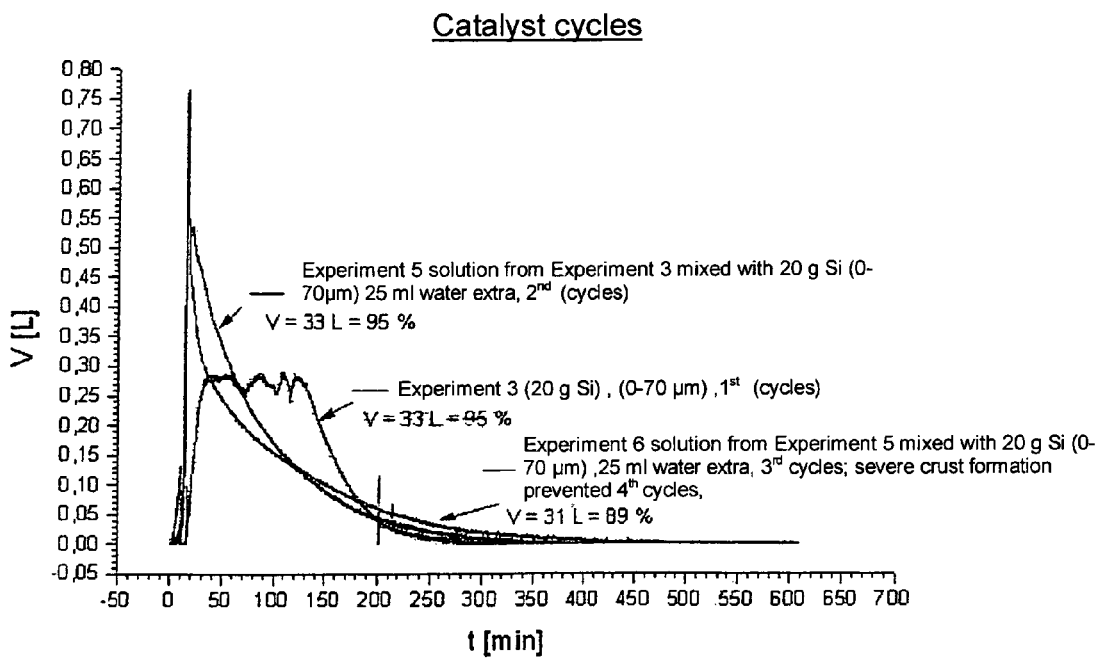

This is achieved in that the alkaline solution is used in a strongly sub-stoichiometric amount with reference to the entire reaction, whereby the silicon dioxide that is formed is precipitated onto crystallization nuclei.

33 Claims, 6 Drawing Sheets

FOREIGN PATENT DOCUMENTS

| | | |
|---|---|---|
| DE | 102 01 773 | 11/2002 |
| DE | 101 43 305 | 7/2003 |
| FR | 1 604 678 | 1/1972 |
| JP | 04 059093 | 2/1992 |
| JP | 2000-191303 | 7/2000 |
| JP | 2004-115348 | 4/2004 |
| JP | 2004-115349 | 4/2004 |
| JP | 2004-307328 | 11/2004 |
| WO | WO 02/14213 | 2/2002 |
| WO | WO 02/090257 | 11/2002 |

OTHER PUBLICATIONS

Response to European Patent Office (with translation).
International Preliminary Report on Patentability.
Written Opinion of the International Searching Authority.

* cited by examiner

PROCESS AND APPARATUS FOR GENERATING HYDROGEN

CROSS REFERENCE TO RELATED APPLICATIONS

This application is the National Stage of PCT/EP2006/010724 filed on Nov. 9, 2006, which claims priority under 35 U.S.C. §119 of German Application No. 10 2005 053 781.2 filed on Nov. 9, 2005 and German Application No. 10 2006 020 786.6 filed May 3, 2006. The international application under PCT article 21(2) was not published in English.

STATE OF THE ART

A method for generating hydrogen is disclosed in DE 102 01 773 A1, in which water is sprayed onto fine-particle silicon in a reaction chamber. In contrast to the method according to the invention, the addition of a catalyst is not described. JP 2004115349 discloses a method in which fine-particle silicon powder is oxidized with water over a long period of time. JP 2004115348 describes a non-catalytic process in which water heated for hydrogen production is pressed through a cartridge that contains silicon.

Similar methods are state of the art (DE 21 67 68; U.S. Pat. No. 909,536; U.S. Pat. No. 3,895,102; DE 101 55 171 A1; DE 199 54 513; JP 2004307328). These use different grades of silicon, e.g. silicon scrap from electronics production (JP 2004307328), for generating hydrogen, e.g. for the operation of fuel cells. In addition to practical utilization of silicon scrap, the good storage and transport capabilities and the comparatively low price of silicon (as compared with aluminum, for example) stand in the foreground here. In the patent application JP 2004307328 of Sanyo Electric Co., a simple device is described, in which scrap silicon from electronics production is brought into contact with an alkaline solution, such as caustic soda, in a vessel. In this connection, the lye reacts with the $SiO_2$ that covers the surface of the silicon, to form sodium silicate and $H_2O$, and the remaining Si reacts with $H_2O$ to form silicic acid and hydrogen. It is disadvantageous that one proceeds from the assumption that the substances to be brought to reaction must stand in a stoichiometric ratio to one another, thereby establishing the proportion of the hydrogen to be obtained by means of the molar ratio of the caustic soda to the silicon oxide (which passivates the surface) and the silicon that lies underneath, ending with the completely stoichiometric formation of sodium silicate. This requires a large amount of relatively expensive caustic soda and results in a large amount of sodium silicate, which must be disposed of.

In another known method (DE 21 67 68), the caustic soda that is used up is regenerated by adding slaked lime $(Ca(OH)_2)$, and therefore in addition to silicon and water, slaked lime or caustic lime has to be used, and the amount of waste increases due to the formation of calcium silicate.

In another known method (U.S. Pat. No. 909,536), sodium metal is used for generating hydrogen, and silicon or aluminum is added to increase the hydrogen yield per kg sodium, since the latter is expensive. In this connection, the silicon reacts with the caustic soda that has formed from the sodium metal, to produce a sodium silicate solution. The high price of the sodium used and the high risk of using alkali metals (e.g. easy inflammability, poor storage capability) are disadvantageous.

Another known method (U.S. Pat. No. 3,669,751) reacts a mixture of aluminum and silicon with an aqueous lye, whereby alumosilicate, which has low solubility, is to be formed. Again, it is disadvantageous that stoichiometric amounts of lye are consumed, making the method more expensive, and that the amount of waste is relatively great, due to the formation of the alumosilicate.

Another method (U.S. Pat. No. 3,895,102), in which silicon is mixed with NaCl, in order to prevent the deposition of sodium silicate, which has poor solubility, on the surface of the silicon, during the subsequent reaction with caustic soda, possesses similar disadvantages. Here, too, the consumption of NaCl is another disadvantage, increasing the costs of the process.

Another known method (WO 02/14213) reacts silicon with water, at an approximately neutral pH, after it has been intimately ground together with silicon dioxide (as a "catalyst"). It is disadvantageous that the reaction yields a noteworthy conversion only when using large amounts of silicon dioxide, which makes the grinding process, which is expensive in any case, even more complicated. Furthermore, the conversion rates are very low, because the work is carried out at pH values around the neutral point, and the reactions rapidly come to a halt due to passivation of the silicon surface, so that renewed grinding of the mixture becomes necessary.

Another known method (DE 199 54 513 A1) circumvents the problem of the low reaction rate of the previous method by working at a high temperature (>170° C.) and using caustic soda as the reaction medium. The lye is then regenerated in a separate crystallizer, forming crystalline silicon dioxide, under hydrothermal conditions. Working at high temperatures (hydrothermal conditions) is disadvantageous, since it causes high pressures to occur, which make an expensive reactor design necessary. Furthermore, precise temperature control and constant circulation pumping of the reaction solution, with adherence to a precise temperature gradient, are necessary in order to allow the silicon dioxide crystals to grow in the crystallizer in targeted manner, and not in the reaction region or on the surface of the silicon used, if at all possible.

In another method by the same applicant (DE 101 55 171 A1), the problem of undesirable growth of the silicon dioxide crystals on the surface of the silicon used is counteracted in that the silicon is completely brought into solution with a sufficient amount of lye. It is disadvantageous that a large amount of lye is used, which must be regenerated in a subsequent step, in complicated manner (hydrothermal crystal synthesis).

The invention is based on the task of clearly improving the known method of generating hydrogen from silicon or amphoteric elements such as aluminum or zinc and an aqueous alkaline solution, in a closed vessel, to the effect that the process proceeds catalytically and continuously after it starts, in the presence of silicon oxide as a nucleating agent, without further feed of lye, and without using high pressures and temperatures (hydrothermal conditions).

According to the method according to the invention, an alkaline solution (catalyst), e.g. sodium silicate solution, is added to the silicon grains contained in the solution, in a clearly sub-stoichiometric ratio with reference to the entire reaction, and crystallization nuclei, e.g. finely ground quartz meal, are added to the solution for the silicon oxide that newly forms from the silicon.

According to the invention, it proves to be advantageous to work at a catalyst concentration between $10^{-4}$ mol/L-10 mol/L.

Although the reaction already takes place at room temperature, it proves to be advantageous to work at an elevated temperature, e.g. between 50° C. and the boiling point of the solution, in order to achieve a higher rate of conversion. Although the reaction releases enough heat to maintain the desired reaction temperature if the reactor walls are sufficiently insulated thermally, external heating of the reactor is provided for a quick start of the reaction. It is also advantageous to thermally insulate other devices that carry media, in order to prevent supersaturation of the solution due to cooling.

In the end result, the silicon placed into the solution is dissolved, and in this connection reacts with the water of the solution, in the presence of the catalyst, giving off hydrogen, to form silicates that decompose on the crystallization nuclei, splitting off silicon dioxide, and release the catalyst again when they do so. In order to guarantee a speedy start of the reaction, it proves to be advantageous to start the reaction with a mixture of approximately 90% silicon and 10% crystallization nuclei, but the reaction can also be reliably started with mixture ratios that deviate significantly from this. Any materials that promote spontaneous crystallization of an $SiO_2$ modification, i.e. the precipitation of hydrated $SiO_2$ (depending on the reaction conditions), because of their high surface and their crystal structure, are suitable as crystallization nuclei, whereby quartz meal is preferred because of its low price. The silicon grains themselves, with their adhering oxide layer, can also assume this task. In this case, it is advantageous to use a relatively high proportion of fine silicon that possesses the necessary high surface in the mixture.

The catalyst allows an extensive reaction of the silicon with the water, in that it promotes the transport of the oxidized silicon from the surface of the silicon grains to the crystallization nuclei, which are added in the form of quartz meal, for example, or which form during the reaction. The precipitated $SiO_2$ can be drawn off by way of a draw-off device. The grain size of the crystallization nuclei can be varied within broad ranges, whereby fine material (<10 μm) is preferred due to its high specific surface. The material containing $SiO_2$ that has precipitated during preceding reactions is used with particular preference.

The resulting hydrogen is drawn off from the device by way of a condenser for removing steam, as is known from the state of the art, then compressed and stored in a pressure vessel, a hydride storage device or the like, or directly supplied to a consumer, for example a fuel cell.

The method according to the invention ends, if no further silicon is placed into the reaction mixture, with complete oxidation of the silicon placed into the device, or of the amphoteric elements placed into the device.

It proves to be advantageous to provide that a method that has once been started for generating hydrogen can also be interrupted. Here, it is provided that removal of the hydrogen from the device according to the invention can be stopped in that no further hydrogen is removed from the device, so that pressure builds up in the device, and the aqueous lye can be pressed into a second vessel, along with the intermediate reaction products, and the silicon to be oxidized or the amphoteric elements remain in the first vessel, within the filter basket, and thereby any further reactions are interrupted. If the process it supposed to be continued, solution situated in the second vessel is pressed back into the first vessel, and the reaction is continued.

A preferred method for controlling the progress of the reaction is to add the catalyst to the reaction mixture over a longer period of time. In this manner, the concentration of the catalyst is slowly increased, and a more uniform development of hydrogen is achieved. Another preferred method for controlling the progress of the reaction is to add the silicon to the reaction mixture continuously or discontinuously. In this manner, first of all, a more uniform hydrogen development is achieved, and second, the amount of hydrogen that can maximally develop is limited, if the reaction must be shut off for some reason.

The grain size of the silicon is not critical for the process, so that both silicon in the form of dust (<1 μm) and coarse pieces (>1 cm) can be used. The size used is limited when using a filter basket, in that the pieces should clearly be larger than the pore size of the filter being used, in order to guarantee the greatest possible conversion before the particles can fall through the filter, whereby a more rapid reaction takes place when using finer particles (e.g. 20-400 μm), because of the higher specific surface.

The method for generating hydrogen, according to the invention, can also be used in that zinc or aluminum or magnesium are added to the solution in place of silicon.

Another method for generating hydrogen, according to the invention, is characterized in that scrap silicon from electronics production is brought together with caustic soda in a sub-stoichiometric ratio in a reaction vessel, and crystallization nuclei of quartz meal are added to the solution, and that the resulting hydrogen can be drawn off, until the scrap silicon that has been brought into the solution has completely oxidized on the crystallization nuclei.

Instead of silicon, zinc, aluminum, or magnesium can be added to the solution for oxidation, in advantageous manner.

It is advantageous that the caustic soda of the solution is supplied in a sub-stoichiometric ratio between 0.5 and 30.0% at the beginning of the reaction.

The solution can be drawn off by way of a filter press, if necessary, and silicon dioxide can be removed from the solution in the filter press and taken out of the process.

In an embodiment, the solution remaining in the filter press can be passed back into the reaction vessel, adding fresh water.

It is advantageous that quartz meal can be supplied to the reaction vessel discontinuously or continuously, by way of a device.

Furthermore, hydrogen gas can be removed from the device by way of a filter, for compression and storing pressure.

It is possible that the reaction process in the reaction vessel is made possible by means of a pressure-related displacement of the solution in a storage vessel.

Another alternative embodiment of the method for generating hydrogen, according to the invention, is characterized in that silicon is oxidized to form silicon oxide, in a reaction vessel, catalytically, with an alkaline solution, and that crystallization nuclei made of quartz meal are added to the solution, and that the resulting hydrogen can be drawn off.

Aside from the advantageous embodiments described above, which are also possible for this additional method according to the invention, it can be advantageous that the alkaline solution has a pH between 8 and 15, which corresponds to an OH concentration of $10^{-6}$ mol/L-10 mol/L, and the substance mixture of $H_2O$, nuclei-forming agents, and reaction elements is supplied, at the beginning of the reaction, in a sub-stoichiometric ratio between 0.5 and 30.0% of the ratio between NaOH and the elements to be oxidized.

In another advantageous embodiment, the reaction of the reaction mixture preferably takes place within a filter basket within the reaction vessel.

In this connection, it is advantageously possible that when the solution with fresh water is supplied again, the solution flows through a device that produces turbulence and eddying.

Figure 5:
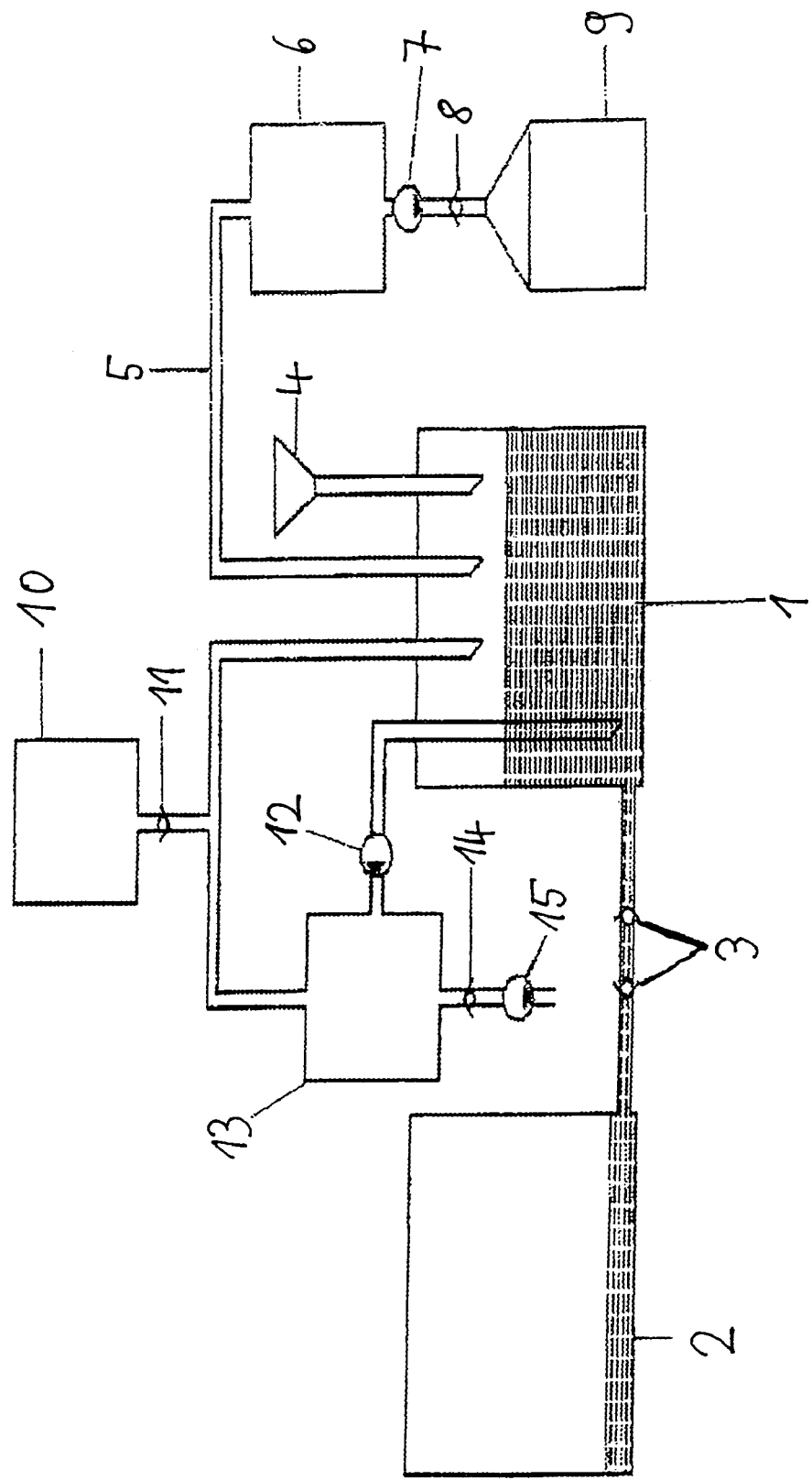
Figure 6:
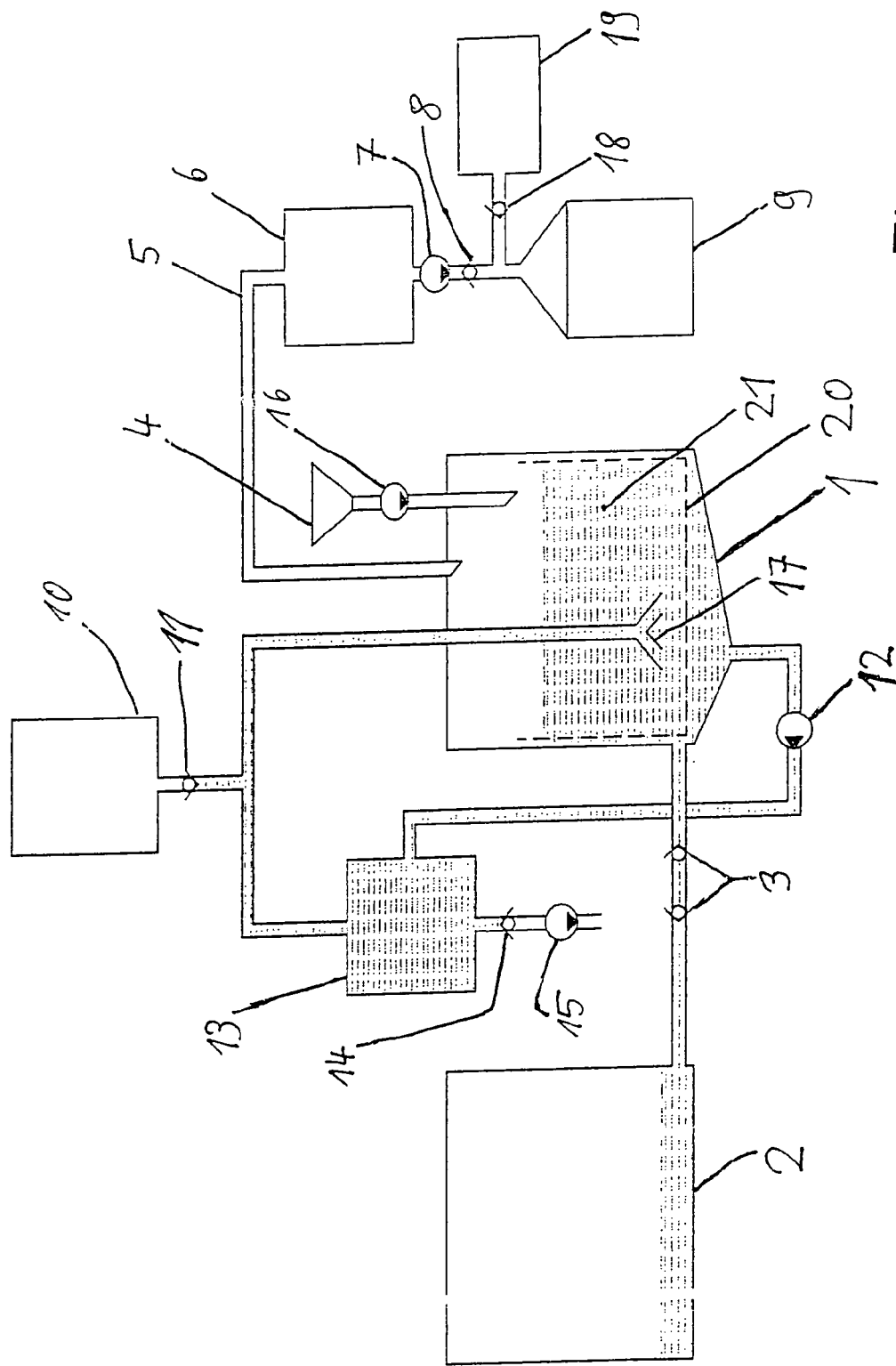
Figure 7:
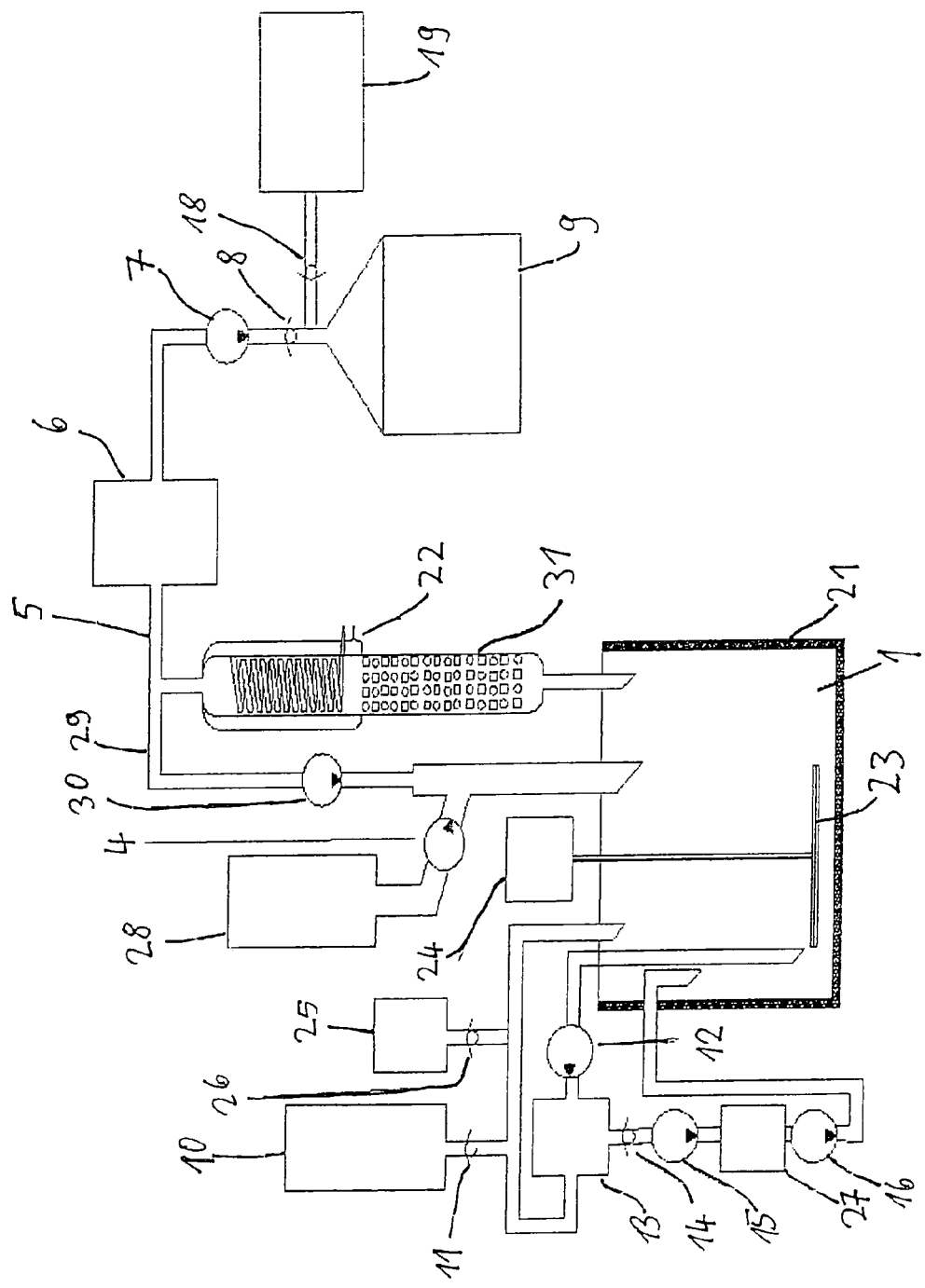
Figure 8:
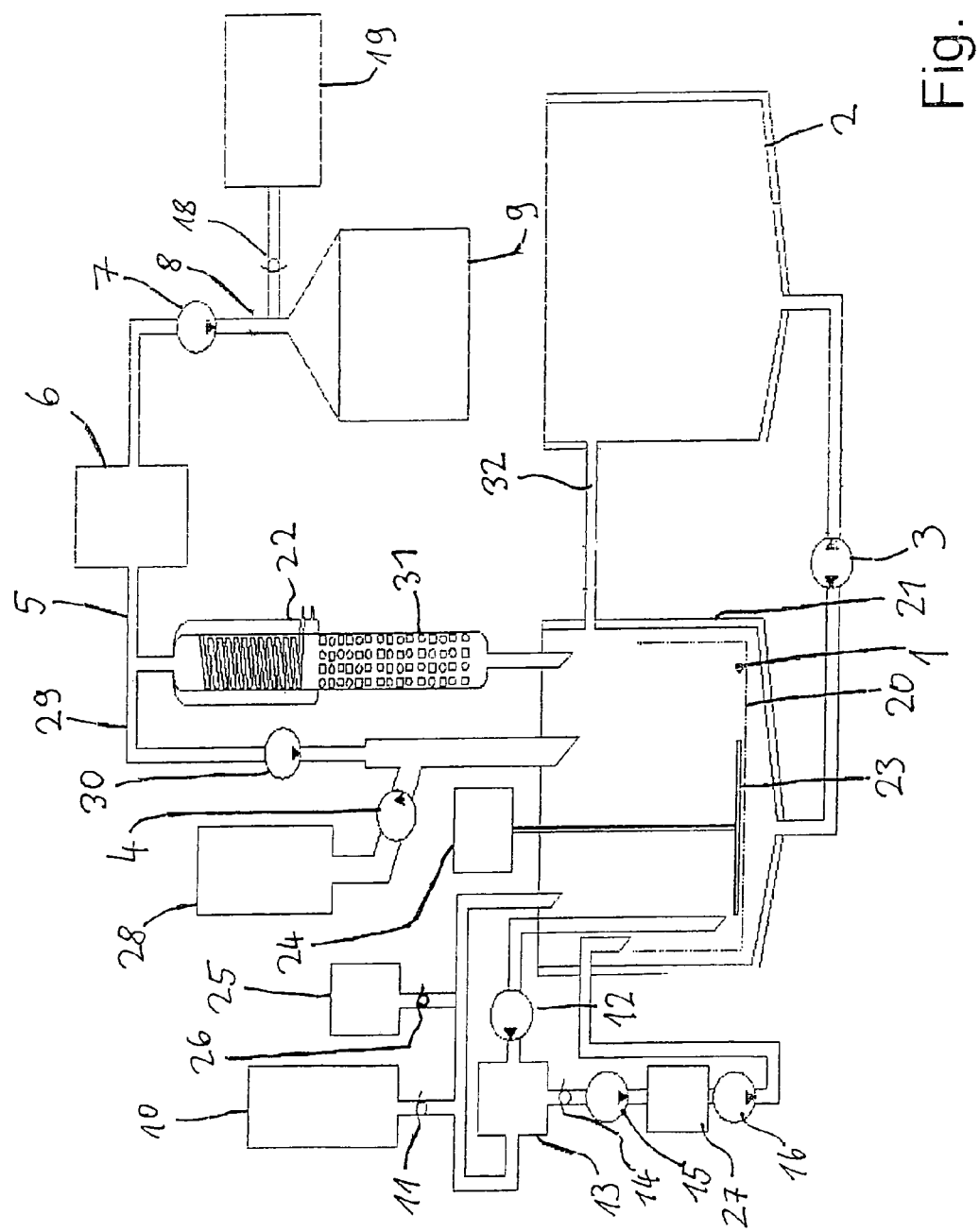

This device will be explained in greater detail below, together with other advantageous embodiments, along with the method according to the invention, using several drawings. These show, in:

FIG. 1 to 4 the results of various experiments to implement the method according to the invention, FIG. 5 a device for technical implementation of the method according to the invention, in a schematic representation, FIG. 6 another device for technical implementation of the method according to the invention, FIG. 7 another alternative device for technical implementation of the method according to the invention, and in FIG. 8 yet another alternative device for technical implementation of the method according to the invention.

The invention will be described below, using exemplary embodiments:

EXAMPLE 1

Comparison of Silicon Batches Having Different Grain Sizes (cf. FIG. 1):

20 g Si (0-70 μm or 200-400 μm), 100 ml demineralized water, and 10 ml silicate of sodium are heated to boiling in a reaction vessel, while stirring. The resulting hydrogen is freed of the major portion of the steam adhering to it in an intensive cooler, and is passed through a tube containing glass wool to remove aerosol particles. The hydrogen development is recorded with a flow measurement device and plotted graphically. This shows that finer silicon powder yields a higher hydrogen flow at a shorter experiment time. When using a silicon batch having a grain size of 0-70 μm, the hydrogen development continues for approximately 5.5 h. When using a silicon batch having a grain size of 200-400 μm, the hydrogen development continues for approximately 9 h. During this experiment, the gas development is very strong at the beginning, then decreases rapidly, and becomes very weak towards the end (cf. FIG. 3, V. 5 and V. 6).

EXAMPLE 2

Constant Hydrogen Development Over a Longer Period of Time (cf. FIG. 2):

20 g Si (0-70 μm) and 50 ml demineralized water are heated to boiling in a reaction vessel, while stirring. A mixture of 10 ml silicate of sodium and 40 ml demineralized water is dripped into this suspension.

At the beginning, a high drip speed is selected (300 ml/h), in order to get the reaction underway quickly, but this is regulated back during the rapid increase. When the maximum is reached, the hydrogen development is kept approximately constant over approximately 1.5 h, by varying the drip speed. The decrease in gas development takes place relatively rapidly when the reaction is conducted this way.

EXAMPLE 3

Reaction on a Larger Scale (cf. FIG. 3):

80 g Si (200-400 μm) and 350 ml demineralized water are heated to boiling in a reaction vessel, while stirring. A mixture of 40 ml silicate of sodium and 10 ml demineralized water is dripped into this suspension.

At the beginning, a high drip speed is selected (300 ml/h), in order to get the reaction underway quickly, but this is regulated back during the rapid increase. At the beginning, the gas development runs out of the measurement range, so that it has, to be shut off for a few minutes. Afterwards, it is possible to regulate the reaction well. A comparison with smaller batches shows that the reaction can be scaled directly.

EXAMPLE 4

Experiments Concerning the Catalytic Nature of the Method (cf. FIG. 4):

The mixture from Example 2, which has finished reacting, is refreshed with 20 g Si (0-70 μm) and 25 ml demineralized water after 24 h, and again heated to boiling, while stirring. The reaction starts spontaneously and yields a similar amount of hydrogen as the first reaction, in a comparable time.

After another 24 h, the mixture from the previous experiment, which has finished reacting, is refreshed with another 20 g Si (0-70 μm) and 25 ml demineralized water, and heated to boiling, while stirring. In this case, too, the reaction starts spontaneously and again yields a comparable amount of hydrogen in a similar time. This shows that the catalyst survives three reaction cycles without any clear loss in activity.

In the following exemplary embodiments, elements that are the same or have the same effect are provided with the same reference symbols.

In the first embodiment of a device according to the invention shown in FIG. 5, silicon and caustic soda, for example, and crystallization nuclei are brought together in a reaction vessel 1. The resulting hydrogen is passed to a hydrogen filter 6 by way of the drain line 5, and to a pressure storage unit 9 by way of a pressure increase device 7 and a filling valve 8.

The mixture in the reaction vessel 1 is circulated by way of a removal device 12, whereby resulting solids can be removed from the circulation by way of a kick-back valve 14 and a removal device 15. Fresh water can be supplied by way of the container 10 and a control valve 11. Silicon and/or quartz meal can be added to the reaction vessel 1 by way of a charging device 4. If no hydrogen is removed from circulation, the aqueous solution with the reaction mixture is pressed into a storage vessel 2 with its liquid components, by way of control valves 3, and hydrogen formation in the reaction vessel 1 comes to a standstill. When pressure is relieved from the reaction vessel 1, for example by removing hydrogen by way of the pressure increase device 7 and the filling valve 8, the solution is pressed out of the storage vessel 2 back into the reaction vessel 1, and hydrogen formation can be continued.

The device shown in FIG. 6 has a similar fundamental structure as the one shown in FIG. 5.

Supplementally, the reaction vessel 1 has a filter basket 20 that can retain solid components of the reaction mixture. Furthermore, the removal device 12 is disposed at the bottom of the reaction vessel. The circulated reaction mixture is passed back to the reaction vessel 1 by way of a turbulence generator 17, for example a nozzle that produces an eddy or spin, in order to achieve better, more thorough mixing in the reaction vessel 1. Aside from the separation or pressure increase device 7 for hydrogen, a hydrogen consumer 19, such as a fuel cell, and a removal valve 18 are directly connected with the apparatus, in addition to the pressure storage unit 9. The reaction vessel 1 is insulated by means of a heating/insulation mantle 21, in order to achieve better temperature stability.

Another embodiment of a device according to the invention is shown in FIG. 7.

A mixture of water and silicon is heated to the reaction temperature (e.g. boiling temperature of water) in the reaction vessel 1, using the heating mantle 21; catalyst is added by way of the metering device for catalyst 26, in the desired amount, and the desired amount of nucleating agent (e.g. $SiO_2$ from the preceding reaction) is added to the reaction mixture from the supply container for nucleating agent 27, using the metering device 16, for a quick and reliable start of the reaction. The motor 24 with stirrer shaft 23 prevents the solids from clumping together, by thoroughly mixing the suspension. The hydrogen that has developed passes through the mist separator 31 after it leaves the reactor, where entrained droplets are precipitated, and through the cooler 22, where entrained steam is condensed. The drain line 5 contains a hydrogen filter 6 that is designed in accordance with the purity requirements for the hydrogen produced. The device 7 compresses the hydrogen for storage in the pressure container 9, or pumps it to the consumer 19 (e.g. a fuel cell).

As examples, two variants for operating the device are described:

Variant 1: Water, catalyst, and nucleating agent are presented and brought to reaction temperature (e.g. 90° C.) by means of heating mantle 21. The desired amount of silicon is added by way of the charging device 4, and continues to be metered in during the reaction, in order to keep the gas flow constant or to change it in desired manner, whereby the circulation pump 30 draws dried hydrogen in through the cooler 22, by way of the circulation line 29, and generates a circulation that prevents the silicon from becoming damp from rising steam out of the reaction vessel 1, and the silicon powder from therefore clumping together in the region of the charging device 4. Consumed water is replaced by adding fresh water via the control valve 11. The addition of more silicon is stopped, at the latest, when the reaction mixture reaches a specific viscosity that makes it necessary to remove the silicon dioxide that has formed from the reaction mixture. For this purpose, the removal device 12 transports the reaction mixture into the filter device 13, in which the solid components are separated (e.g. with filter cloth presses) and conveyed into the supply container 27 by way of the removal device 15. From this container, the desired amount of nucleating agent is placed into the reaction vessel 1 as needed (e.g. when starting a new reaction after cleaning the reaction vessel 1). Excess solid is removed by way of the drain valve 14 and the drain connector 36 and passed on to further utilization (cement industry, glass producers, etc.).

The filtrate is passed back into the reaction vessel 1 and enriched with fresh water from the supply container 10 there. The type of fresh water is not critical, in this connection, so that not only demineralized water but also drinking water, process water, river water, etc., can be used.

Variant 2: Water, nucleating agent, and the entire amount of silicon are presented and brought to reaction temperature. For this purpose, a little catalyst is added by way of the metering device 26, so that the reaction starts. By metering catalyst in during the reaction, the desired hydrogen flow is established. Processing takes place as described for Variant 1.

The embodiment of the invention shown in FIG. 8 fundamentally corresponds to that shown in FIG. 7. In addition, it allows interruption of the hydrogen development, in that the reaction solution is pressed into the storage vessel 2 by means of the refilling device 3. In this connection, the filter basket 20 ensures that the silicon remains in the reaction vessel 1, for the most part, whereby the meshes of the filter basket should be clearly smaller than the average particle size of the silicon grains. The gas dispensing line 32 assures pressure equalization when solution is pumped back and forth between the two vessels, and ensures that hydrogen that forms from fine silicon particles that are not retained by the filter basket can escape. The refilling device 3 does not necessarily have to be a pump, but instead, the refilling process can also be achieved by lifting and lowering the storage vessel (if flexible lines are provided), for example. In order to allow fast stopping of the reaction in the storage vessel 2 even in the presence of fine-particle residual silicon, if necessary, the storage vessel 2 is equipped with a cooling device 33.

The invention is not limited to the above exemplary embodiments and operational variants, but instead can still be modified in many different ways, without departing from the basic idea. The precise type of structure of the devices, in particular, can be modified within broad ranges, as long as the fundamental method according to the invention can run on them. The type and configuration of the different supply, feed, drain, mixing, heating, and cooling devices can be varied in accordance with the skill of a person skilled in the art, as can the related control and system technology. The same holds true for the type and use of the hydrogen generated, the waste products, and other intermediate reaction products. The starting materials can stem from different sources, as long as they have the chemical properties required for the reaction to proceed.

REFERENCE SYMBOL LIST 1. reaction vessel
2. storage vessel for production interruption
3. control valves between reaction vessel and storage vessel
4. charging device for silicon and quartz meal
5. drain line for hydrogen
6. hydrogen filter
7. pressure increase device or compressor for hydrogen
8. filling valve for hydrogen pressure container
9. pressure storage unit for hydrogen
10. supply container for fresh water
11. control valve for fresh water feed
12. removal device or pump for reaction mixture
13. filter device or press for separating solid and liquid
14. kick-back valve
15. removal device for solid
16. metering device for nucleating agent
17. turbulence generator
18. removal valve for hydrogen
19. hydrogen consumer
20. filter basket
21. heating/insulation mantle
22. cooler/condenser for steam
23. stirrer mechanism
24. stirrer motor
25. supply container for catalyst
26. metering device for catalyst
27. supply container for nucleating agent
28. supply container for silicon
29. circulation line for hydrogen
30. circulation pump for hydrogen
31. mist separator
32. gas dispensing line
33. cooling device
34. refilling device between reaction vessel and storage vessel
35. drain valve for solid
36. drain connector for solid

The invention claimed is:

1. A method for generating hydrogen comprising reacting silicon and/or an alloy that contains silicon in a reaction vessel (1), with an alkaline solution as a catalyst in a presence of crystallization nuclei, to produce hydrogen and silicon dioxide, wherein alkali contained in the alkaline solution is present in a sub-stiochiometric ratio between 0.5 and 30.0% with reference to the entire reaction, whereby the silicon dioxide that is formed is precipitated onto the crystallization nuclei.

2. The method according to claim 1, wherein the crystallization nuclei are added to the solution.

3. The method according to claim 1, wherein crystallization nuclei of silicon dioxide are added.

4. The method according to claim 1, wherein the catalyst in the reaction mixture of water, crystallization nuclei, and reaction elements possesses a concentration between $10^{-4}$ mol/L and 10 mol/L at the end of the reaction.

5. The method according to claim 1, wherein the catalyst is supplied to the reaction mixture discontinuously or continuously.

6. The method according to claim 1, wherein an alkaline metal compound is used as the catalyst, preferably from the group of alkali metal and/or earth alkali metal hydroxides, silicates, or carbonates.

7. The method according to claim 1, wherein a compound from the group of organic bases or their salts, preferably guanidine, is used as the catalyst.

8. The method according to claim 1, wherein the silicon is dissolved in the alkaline aqueous solution at a pressure close to atmospheric pressure.

9. The method according to claim 1, wherein the silicon is dissolved in the alkaline aqueous solution at a pressure above atmospheric pressure.

10. The method according to claim 1, wherein hydrogen development is controlled by means of addition of the catalyst metered over time.

11. The method according to claim 1, wherein hydrogen development is controlled by means of addition of the silicon metered over time.

12. The method according to claim 11, wherein a metering device for silicon has a dry flushing gas flowing through it.

13. The method according to claim 12, wherein the dry flushing gas is a partial stream of the hydrogen that is generated.

14. The method according to claim 1, wherein a circulation of dry hydrogen is generated by means of a circulation pump (30) and a cooler (22).

15. The method according to claim 12, wherein the dry flushing gas is an inert gas from the group of noble gases and/or nitrogens.

16. The method according to claim 1, wherein the aqueous reaction mixture is prepared or refreshed using water from the group of demineralized water, rainwater, drinking water, process water, river water, ocean water.

17. The method according to claim 1, wherein solid is continuously or discontinuously removed from the reaction mixture.

18. The method according to claim 17, wherein the solid is removed by means of a separation device.

19. The method according to claim 17, wherein the solid is removed from the reaction mixture by means of centrifugation.

20. The method according to claim 17, wherein the solid is removed from the reaction mixture by means of a filter press.

21. The method according to claim 18, wherein the alkaline solution remaining in the separation device is passed back into the reaction vessel (1) with the addition of fresh water.

22. The method according to claim 18, wherein the alkaline solution remaining in the separation device is passed back into the reaction vessel (1) without the addition of fresh water.

23. The method according to claim 1, wherein the crystallization nuclei are discontinuously or continuously supplied to the reaction vessel (1).

24. The method according to claim 1, wherein hydrogen gas for compression, storage and/or consumption is removed from the reaction vessel (1) by way of a filter.

25. The method according to claim 1, wherein the hydrogen that is generated flows through a mist separator (31) to remove aerosols.

26. The method according to claim 1, wherein the mist separator (31) consists of a filler body column and/or a cyclone.

27. The method according to claim 1, wherein the hydrogen that is produced flows through a cooler to remove steam.

28. The method according to claim 1, wherein the step of reacting silicon and/or an alloy that contains silicon in the reaction vessel (1) with an alkaline solution as a catalyst is controlled by means of a displacement of the alkaline solution into a storage vessel (2).

29. The method according to claim 28, wherein the step of reacting silicon and/or an alloy that contains silicon in the reaction vessel with an alkaline solution as a catalyst is slowed down in the storage vessel (2) by means of cooling.

30. The method according to claim 1, wherein the grain size distribution of the substance to be oxidized amounts to a few μm to 75 μm for rapid conversion rates.

31. The method according to claim 1, wherein for slower reactions and/or reactions that run for a long time, the grain size distribution of the substance to be oxidized amounts to between 75 μm and 1.0 mm.

32. The method according to claim 1, wherein the temperature range for the step of reacting silicon and/or an alloy that contains silicon in the reaction vessel with an alkaline solution as a catalyst lies between 80 and 100° C.

33. The method according to claim 1, wherein scrap silicon from electronics production is brought together with a caustic soda, in a sub-stoichiometric ratio between 0.5 and 30%, in a reaction vessel (1), and crystallization nuclei of quartz meal added to it, and the hydrogen that is formed can be drawn off, until the scrap silicon that has been introduced into the solution has completely oxidized on the crystallization nuclei.

* * * * *